(12) United States Patent
Bassetti et al.

(10) Patent No.: US 8,785,526 B2
(45) Date of Patent: Jul. 22, 2014

(54) POLYOXYMETHYLENE FIBERS IN CONCRETE

(75) Inventors: Steven Bassetti, Cincinnati, OH (US);
Robert M. Gronner, Erlanger, KY (US); Thomas Heyer, Lawrenceburg, IN (US); Hanno Hueckstaedt, Kelkheim (DE); Arvind Karandikar, Morristown, TN (US)

(73) Assignee: Ticona LLC, Florence, KY (US)

( * ) Notice: Subject to any disclaimer, the term of this patent is extended or adjusted under 35 U.S.C. 154(b) by 182 days.

(21) Appl. No.: 13/325,171

(22) Filed: Dec. 14, 2011

(65) Prior Publication Data

US 2012/0157576 A1    Jun. 21, 2012

Related U.S. Application Data

(60) Provisional application No. 61/423,659, filed on Dec. 16, 2010.

(51) Int. Cl.
*C04B 28/02* (2006.01)
*C04B 24/26* (2006.01)
*C04B 16/06* (2006.01)
*D01F 6/00* (2006.01)

(52) U.S. Cl.
USPC .............. 524/5; 524/4; 524/539; 211/14

(58) Field of Classification Search
CPC .... C04B 24/26; C04B 28/02; C04B 16/0675; B29B 9/00; C08G 18/42; D01F 6/78
USPC ............... 524/5, 4, 539; 264/211.12
See application file for complete search history.

(56) References Cited

U.S. PATENT DOCUMENTS

| | | | |
|---|---|---|---|
| 4,975,518 A | 12/1990 | Broussard et al. | |
| 4,975,519 A | 12/1990 | Yang et al. | |
| 4,983,708 A | 1/1991 | Yang et al. | |
| 5,004,798 A | 4/1991 | Broussard et al. | |
| 2004/0175566 A1* | 9/2004 | Kikutani et al. | 428/393 |
| 2008/0248271 A1* | 10/2008 | Erb et al. | 428/219 |
| 2009/0264583 A1* | 10/2009 | Kurz et al. | 524/539 |

FOREIGN PATENT DOCUMENTS

| | | |
|---|---|---|
| EP | 0079554 | 5/1983 |
| EP | 0501352 | 9/1992 |
| EP | 1431428 | 6/2004 |
| JP | 2002 029793 | 1/2002 |

OTHER PUBLICATIONS

ASTM-C1399 Standard Test Method for Obtaining Average Residual Strength of Fiber-Reinforced Concrete.
Extended European Search Report Jun. 27, 2012.

* cited by examiner

*Primary Examiner* — Michael M Bernshteyn
(74) *Attorney, Agent, or Firm* — Dority & Manning, PA

(57) ABSTRACT

Disclosed are polymeric additives for concrete formed of a polyoxymethylene (POM) copolymer. POM copolymers can be utilized to form fibrous additives for concrete, i.e., microfibers and/or macrofibers. The POM copolymers can include one or more chemical groups, e.g., end groups and/or pendant groups that can increase the polarity of the POM and increase the hydrophilicity of the formed fibers, which can improve miscibility of the fibers in wet concrete. Chemical groups of the POM copolymers can bond with components of the concrete or can hydrolyze to form groups that can bond with components of the concrete, e.g., form covalent or noncovalent (e.g., electrostatic or ionic) bonds with one or more components of the concrete binder.

28 Claims, 2 Drawing Sheets

POLYOXYMETHYLENE FIBERS IN CONCRETE

CROSS REFERENCE TO RELATED APPLICATION

This application claims filing benefit of U.S. Provisional Patent Application Ser. No. 61/423,659 having a filing date of Dec. 16, 2010, which is incorporated herein by reference in its entirety.

BACKGROUND

Concrete is the most commonly used man-made construction material in the world. Concrete includes a binder component and an aggregate component. The binder component is cement, which is generally formed of a calcined limestone-based composite, and the aggregate component is generally formed of quartz sand or calcium carbonate.

Improvements in the properties of concrete have been obtained in the past by combining the concrete with modifying additives. Common modifications to improve concrete include the addition of fibrous materials to the binder such as metal, polymeric, glass, and natural fibers, and formation in conjunction with rebar. Synthetic fibers have been used for several decades as a reinforcing agent for concrete, particularly for slab on grade applications. Fiber reinforced concrete can exhibit decreased shrinkage, decreased permeability and even increased abrasion and shatter resistance, depending upon the specific materials used in the composite.

The nature of the fiber reinforcement can vary. Microfibers, ranging from about 1 to about 10 denier are typically used to help prevent plastic shrinkage cracking as the concrete sets. The presence of the microfibers at loadings of about 1 to 3 pounds per cubic yard ($lb/yd^3$) of concrete prevents micro-cracking of the concrete in the first 24 to 48 hours after pouring, as the bulk of the water in the mixture evaporates. Fibrillated or embossed macrofibers in the range of about 1000 denier are often added at loadings of 3 to 8 $lb/yd^3$ as a secondary reinforcement. These fibers are added to improve overall toughness, as quantified by measurements of residual strength after first break on concrete samples containing the fibers (e.g., as measured according to ASTM C-1399). In both cases, the fibers ideally can be easily mixed with the wet concrete mixture and resist separating during the finishing and setting steps. Level of property enhancements to the concrete depends on both the strength of the fiber and adhesion between the fiber and the concrete matrix.

Polypropylene has been the material of choice by the concrete industry for both micro- and macrofibers. Polypropylene fibers can be easily formed via melt spinning (both micro- and macrofibers) or cutting from thin films (e.g., tape fibers or fibrillated fibers). Polypropylene fibers can exhibit tenacity on the order of 5 grams-force per denier (g/den). In addition, polypropylene is alkali resistant, which is critically important for any concrete additive (pH of concrete is typically 11 or higher). However, polypropylene does have disadvantages. Its low density and hydrophobicity combine to make it tend to bloom to the surface during finishing. This can cause surface appearance problems. Further, polypropylene fibers will not chemically bond to concrete, and rely only on mechanical interactions for adhesion to the matrix.

Other materials have been tried in an attempt to mitigate the disadvantages of polypropylene fiber additives. Polyamide fibers have been examined as polyamide is a denser material and thus expected to resist surface bloom. However, the moisture absorption of polyamides, resulting in lower strength and modulus, rendered these fibers less effective overall in concrete applications. Polyvinyl alcohol (PVA) fibers have also been developed for use in concrete. The obvious advantage is the potential for chemical bonding between the concrete matrix and pendant —OH groups on the polymer backbone. However, this sought-after bonding actually led to additional problems. In fact, pretreatment of PVA fibers with formaldehyde ($HCHO_{(aq)}$) to bind a fraction of the —OH groups as the cyclic formal was found to be necessary to reduce the fiber—concrete interaction and reduce stress in the cured concrete product. In addition, PVA fibers are quite expensive and successful utilization requires an on-site, multistep mixing process with the concrete. Despite these difficulties, PVA fibers have found limited use in specialty concrete applications, such as precast concrete for earthquake-proof structures. Its use beyond these specialty applications has been quite limited.

While there have been improvements in composite materials incorporating fibrous polymeric materials, there remains room for further improvement and variation within the art. Fibrous polymeric modifiers and methods of using the modifiers with concrete that can provide further structural improvements to construction materials would be beneficial.

SUMMARY

According to one embodiment, disclosed is a concrete that includes an aggregate, a cementitious binder, and a plurality of discrete fibers. The fibers include a polyoxymethylene (POM) copolymer in an amount of at least about 50% by weight of the fibers and exhibit a water contact angle of less than about 30°, or less than about 20° in one embodiment.

The copolymer can include a high number of hydroxyl terminal groups. For instance, at least about 50% of the terminal groups of the POM copolymer can be hydroxyl groups. In one embodiment, an individual copolymer chain can include between about 15 and about 20 terminal hydroxyl groups.

The POM copolymer can be the product of a copolymerization reaction of trioxane with a monomer. Representative monomers include a cyclic acetal containing at least one $O(CH_2)_n$ group where n is greater than 1, a cyclic formal having pendant acrylate or substituted acrylate ester groups, a cyclic ester, glycerol formal acetate, and glycerol formal formate.

The fibers can be microfibers and/or macrofibers. For instance, the concrete can include microfibers in an amount up to about 3 pounds per cubic yard and can include macrofibers in an amount up to about 8 pounds per cubic yard.

Also disclosed is a method of forming concrete. A method can include dispersing a plurality of discrete fibers as described herein throughout the concrete. The fibers can be premixed with a component of the concrete. For instance, the fibers can be mixed with dry cement or with wet cement prior to further mixing with the aggregate.

BRIEF DESCRIPTION OF THE FIGURES

A full and enabling disclosure of the present disclosure, including the best mode thereof, to one of ordinary skill in the art, is set forth more particularly in the remainder of the specification, including reference to the accompanying figures in which.

DETAILED DESCRIPTION

Figure 1:
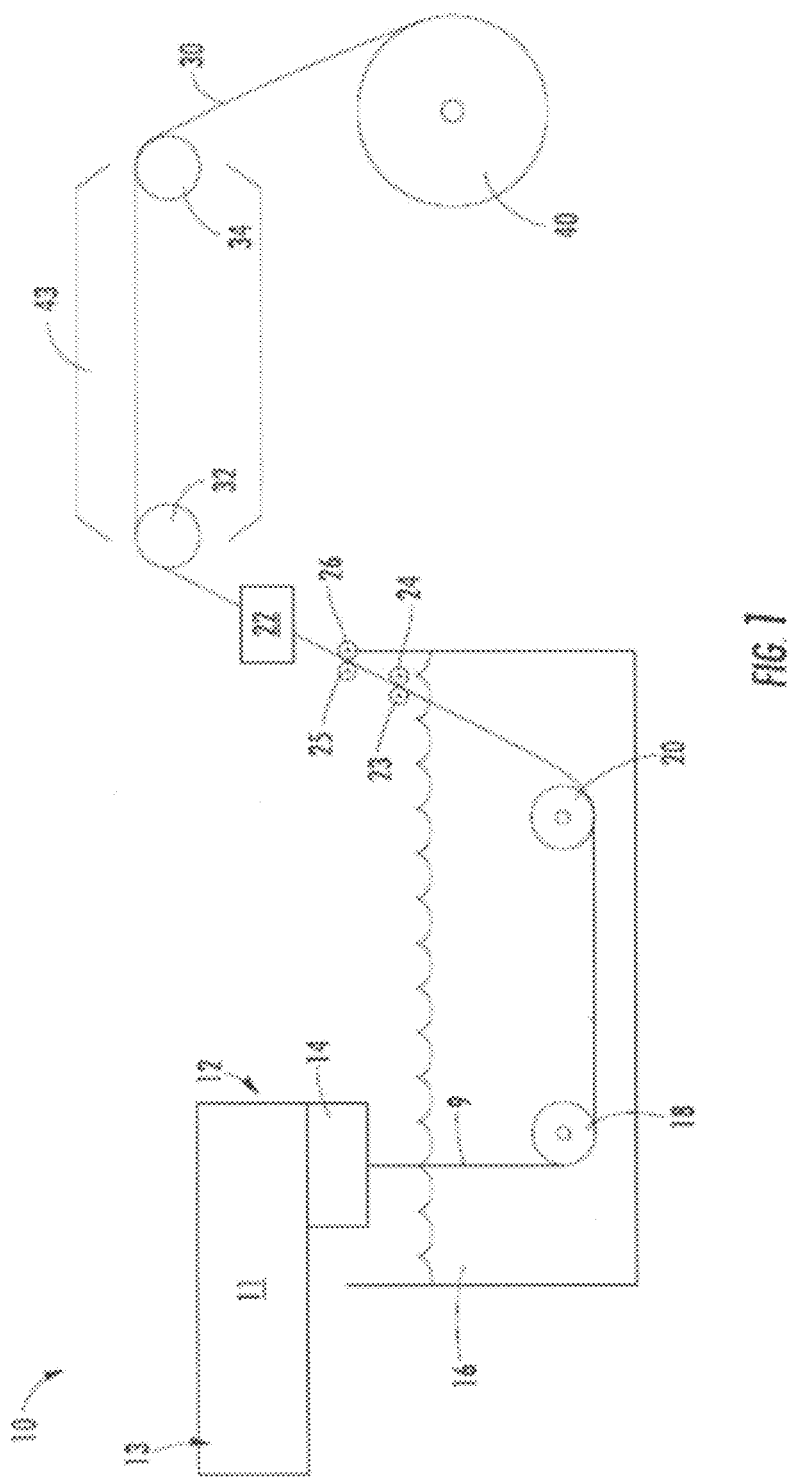
FIG. 1 schematically illustrates one method for forming a fiber as described herein.

It is to be understood by one of ordinary skill in the art that the present discussion is a description of exemplary embodiments only, and is not intended as limiting the broader aspects of the present disclosure.

In general, disclosed herein are polymeric additives for concrete formed of a polyoxymethylene (POM) copolymer. More specifically, POM copolymers can be utilized to form fibrous additives for concrete, i.e., microfibers and/or macrofibers. The POM fibers can mix well with wet concrete and resist surface blooming during concrete set. In one embodiment, POM copolymers utilized to form the fibrous additives can include one or more chemical groups, e.g., end groups and/or pendant groups that can further improve integration of the fibrous additives formed of the polymer with the wet concrete. Chemical groups encompassed herein include groups that can increase the polarity of the POM and increase the hydrophilicity of the formed fibers, which can improve miscibility of the fibers in wet concrete. Also encompassed herein are chemical groups that can bond with components of the concrete or can hydrolyze to form groups that can bond with components of the concrete, e.g., form covalent or non-covalent (e.g., electrostatic or ionic) bonds with one or more components of the concrete binder, so as to further improve strength characteristics of the concrete.

In general, POM polymers for use in forming disclosed additives can be copolymers that can exhibit resistance to the alkali nature of concrete. As used herein and in the accompanying claims, the term "copolymer" is intended to encompass any polymer having, as at least part of the polymer chain, structural units derived from trioxane and cyclic formals or their functionalized derivatives. Thus, the term "copolymer" as used herein and in the accompanying claims is intended to encompass terpolymers, tetrapolymers, and the like that include structural units in the polymer chain derived from trioxane and cyclic formals or their functionalized derivatives in addition to other units, if present during polymerization. For instance, other units can be derived from trioxane or a mixture of trioxane and dioxolane and cyclic formals, e.g., cyclic ether and cyclic acetal monomers.

A copolymerization process can include synthesis of the POM-forming monomers. For instance, trioxane can first be formed by the trimerization of formaldehyde in an aqueous phase, and subsequent separation and purification of the formed monomer.

In one embodiment, a POM copolymer can be manufactured by the copolymerization of trioxane with 0.2 to 6 parts per 100 parts of trioxane of cyclic acetal containing at least one $O(CH_2)_n$ group where n>1. In general, the POM copolymer can include at least 50 mol-%, such as at least 75 mol-%, such as at least 90 mol-% and such as even at least 95 mol-% of —$CH_2O$-repeat units.

The copolymerization can be initiated by cationic initiator as is generally known in the art, such as organic or inorganic acids, acid halides, and Lewis acids. One example of the latter is boron fluoride and its coordination complexes with organic compounds in which oxygen or sulfur is the donor atom. The coordination complexes of boron trifluoride may, for example, be a complex with a phenol, an ether, an ester, or a dialkyl sulfide. Boron trifluoride etherate ($BF_3.Et_2O$) is one preferred coordination complex useful in the cationic copolymerization processes. Alternately, gaseous $BF_3$ may be employed as the polymerization initiator.

Catalyst concentration may be varied within wide limits, depending on the nature of the catalyst and the intended molecular weight of the copolymer. For example, catalyst concentration may range from about 0.0001 to about 1 weight percent, and in one embodiment can range from about 0.001 to about 0.1 weight percent, based on the total weight of the monomer mixture.

A chain transfer agent can also be utilized during polymerization of the monomers. In general, a relatively small amount of a chain transfer agent can be used, e.g., about 100 to about 1000 ppm.

In one embodiment, the chain transfer agent can be an acetal such as methylal, butylal, mixtures of acetals, and the like. Other typical chain transfer agents such as esters or alcohols including methyl formate, methanol, and so forth may be used. Utilization of such chain transfer agents can form a POM copolymer that can be used to form a fibrous additive for concrete that can show multiple improvements as compared to previously known fibrous additives. For instance, the POM copolymer can exhibit increased density as compared to polymers such as polypropylene that have been used to form fibrous additives in the past. Fibers formed from a higher density polymer can be less likely to bloom to the surface of the wet concrete during set. Accordingly, the fibers can remain distributed throughout the concrete following cure to provide improved strength characteristics to the concrete.

In addition, fibers formed of the POM copolymers can exhibit increased hydrophilicity as compared to fibers formed of more traditional polymers, such as polypropylene. For instance, and as discussed below in the examples section, a trioxane/cyclic acetal POM copolymer formed with a methylal chain transfer agent can have a water contact angle of less than about 30°, or less than about 25° in one embodiment. As comparison, polypropylene generally has a water contact angle of greater than 35°. The increased hydrophilicity of the POM copolymer can improve mixing between POM polymeric fibers and the wet concrete and can also prevent blooming of the fibers to the surface of the concrete during cure.

A POM copolymer can be formed so as to further enhance the beneficial aspects of the material. For instance, a POM copolymer can be formed to include terminal groups, which can include both end group and side or pendant functional groups, such as hydroxyl groups, so as to further improve the hydrophilicity of the polymer. In one embodiment, terminal groups can provide binding sites for formation of bonds between the fibrous additives and components of the concrete matrix. For instance, terminal hydroxyl groups can provide electrostatic binding with components of the concrete binder.

According to one embodiment, a POM copolymer can be formed to include a relatively high number of terminal hydroxyl groups on the copolymer. For example, the POM copolymer can have terminal hydroxyl groups, for example hydroxyethylene groups and/or hydroxyl groups, in greater than about 50% of all the terminal sites on the polymer, which includes both polymer end groups and terminal side, or pendant, groups. For instance, greater than about 70%, greater than about 80%, or greater than about 85% of the terminal groups on the POM copolymer may be hydroxyl groups, based on the total number of terminal groups present. In one embodiment, up to about 90%, or up to about 85% of the terminal groups on the POM copolymer may be hydroxyl groups. In one preferred embodiment, a POM copolymer can include up to about 20 hydroxyl groups per polymer chain, for instance, between about 15 and about 20 hydroxyl groups per chain.

The POM copolymer can have a content of terminal hydroxyl groups of at least about 5 mmol/kg, such as at least about 10 mmol/kg, such as at least about 15 mmol/kg. For example, the terminal hydroxyl group content ranges from about 18 to about 50 mmol/kg.

Through formation of additional terminal hydroxyl groups, the copolymer can exhibit increased hydrophilicity. For example, fibers including a POM copolymer that includes a relatively high percentage of terminal hydroxyl groups can exhibit a water contact angle of Less than about 25°, less than about 20°, or less than about 15°. For instance, the fibers can exhibit a contact angle of less than about 21°, in one embodiment.

A POM copolymer can be formed to include a high percentage of terminal hydroxyl groups through selection of the chain transfer agent used during polymerization. For instance, a glycol chain transfer agent such as ethylene glycol, diethylene glycol, mixtures of glycols, and the like can be used in a copolymerization of trioxane with a cyclic acetal containing at least one $O(CH_2)_n$ group where n>1. According to this embodiment, greater than about 80%, for instance greater than about 85% of the terminal end groups on the formed POM copolymer can be ethoxyhydroxy or —$OCH_2CH_2OH$ (—$C_2OH$) end groups. This type of POM copolymer (i.e., trioxane copolymerized with a cyclic acetal in the presence of an ethylene glycol chain transfer agent) is referred to throughout this disclosure as POM-OH.

A POM copolymer can be formed from polymerization of one or more monomers that can produce on the copolymer terminal groups that can provide desirable characteristics to the fibrous concrete additives formed of the POM copolymers. For example, a copolymer can be formed so as to include terminal and/or pendant groups including, without limitation, alkoxy groups, formate groups, acetate groups and/or aldehyde groups. The terminal groups can be functional as formed, e.g., the terminal groups of the as-formed polymer can increase hydrophilicity of the POM copolymer and/or can provide bonding sites for bonding with one or more components of the concrete. Alternatively, the formed copolymer can be further treated to form terminal groups useful in the formed concrete additives. For example, following formation, the copolymer can be subjected to hydrolysis to form the desired terminal groups on the copolymer.

Without wishing to be bound to any particular theory, it is believed that the formation of additional reactive terminal groups (i.e., end groups and pendant groups) on a POM polymer can encourage bond formation between the POM copolymer and components of the cement binder. For instance, Portland cement is a complex mixture of di- and tricalcium silicates, tricalcium aluminate, and a smaller amount of a ferrite phase. Accordingly, the hydroxyl groups of a polymer can bond —Si—OH, Al—OH, and Fe—OH moieties of a Portland cement. Similar binding can take place with other binders as are known in the art.

Any of a variety of different monomers can be copolymerized with one or more other POM-forming monomers, e.g., trioxane. Monomers can include, without limitation, cyclic formals having pendant acrylate or substituted acrylate ester groups, cyclic ethers, cyclic acetals, and so forth. By way of example, trioxane can be copolymerized with 1,2,6-hexanetriol formal or its ester derivatives, as described in U.S. Pat. No. 4,975,518 to Broussard, et al.; ester derivatives glycerol formal, as described in U.S. Pat. No. 4,975,519 to Yang, et al.; glycidyl ester derivatives, as described in U.S. Pat. No. 4,983,708 to Yang, et al.; and trimethylolpropane formal derivatives, as described in U.S. Pat. No. 5,004,798 to Broussard, et al. (all patents are incorporated herein by reference). Monomers can include, without limitation, $\alpha,\alpha$- and $\alpha,\beta$-isomers of glycerol formal, such as glycerol formal acetate (GFA), glycerol formal methacrylate, glycerol formal crotonate, and glycerol formal chloroacetate; glycerol formal formate (GFF); 1,2,6-hexanetriol formal acetate; glycidyl acrylate; 5-ethyl-5-hydroxymethyl-1,3-dioxane (EHMDO); EHMDO ester of acetic acid; EHMDO ester of acrylic acid; EHMDO ester of 3-choro-propanoic acid; EHMDO ester of 2-methylacrylic acid; EHMDO ester of 3-methylacrylic acid; EHMDO ester of undedocenoic acid; EHMDO ester of cinnamic acid; EHMDO ester of 3,3-dimethylacrylic acid; and so forth.

A monomer can include a terminal group that is much less reactive during polymerization as compared to the formal group itself or the trioxane, e.g., an ester group, a formate group, or an acetate group. Accordingly, the terminal group can remain unreacted during polymerization to form an essentially linear polymer with side chain functionality. This side chain functionality can be suitable for use as is or, alternatively, can be hydrolyzed following polymerization to yield pendant hydroxyl functional groups. Hydrolysis following polymerization can also remove unstable hemiacetal end groups and improve the stability of the resulting copolymers.

In one preferred embodiment, a POM copolymer can be formed via the copolymerization of trioxane with between about 0.2 and about 6 parts GFF per 100 parts trioxane or 0.2 to 6 parts of a combination of 1,3-dioxolane and GFF per 100 parts trioxane, using ethylene glycol as the chain transfer agent. This copolymer, following hydrolysis, can have about 80% or higher —$C_2OH$ end groups and up to 20 to 30 pendant —OH groups per chain. This copolymer is referred to throughout this disclosure as lateral-OH POM.

Multiple monomers may be employed in forming the disclosed copolymers so as to form tri- or tetra-polymers. For instance, a trioxane can be polymerized with a mixture of dioxolane and one or more of the cyclic formals described above. Additional monomers as are generally known in the art can be incorporated in disclosed copolymer. Exemplary monomers can include ethylene oxide, 1,3-dioxolane, 1,3-dioxepane, 1,3-dioxep-5-ene, 1,3,5-trioxepane, and the like.

The polymerization can be carried out as precipitation polymerization or in the melt. By a suitable choice of the polymerization parameters, such as duration of polymerization or amount of chain transfer agent, the molecular weight and hence the melt index value of the resulting polymer can be adjusted. The target melt index of a POM copolymer can be between about 2 decigrams per minute (dg/min) and about 30 dg/min, between about 5 dg/min and about 20 dg/min, or between about 8 dg/min and about 10 dg/min.

Following formation, a polymeric composition including the POM copolymer can be processed to form a fibrous additive for concrete. A polymeric composition can include components in addition to the POM copolymer. The amount of the POM copolymer present in a polymeric composition can vary. In one embodiment, for instance, the composition contains the POM copolymer in an amount of at least about 50% by weight, such as in an amount greater than about 60% by weight, such as in an amount greater than about 65% by weight, such as in an amount greater than about 70% by weight. In general, the POM copolymer is present in an amount less than about 95% by weight, such as in an amount less than about 90% by weight, such as in an amount less than about 85% by weight.

Additives as may be incorporated in a polymeric composition can include other polyoxymethylene homopolymers and/or polyoxymethylene copolymers. Such polymers, for instance, are generally unbranched linear polymers which contain as a rule at least 80%, such as at least 90%, oxymethylene units.

In addition to the POM copolymer, the polymeric composition can include an impact modifier and a coupling agent if desired for an attachment between a POM polymer and the impact modifier. The impact modifier may comprise a thermoplastic elastomer. In general, any suitable thermoplastic elastomer may be used. In one embodiment, for instance, the thermoplastic elastomer may include reactive groups that directly or indirectly attach to reactive groups contained on a POM polymer (i.e., either the POM copolymer as described above or additional POM polymers incorporated in the polymeric composition). For instance, the thermoplastic elastomer can have active hydrogen atoms which allow for covalent bonds to form with the hydroxyl groups on the polyoxymethylene using a coupling agent.

Thermoplastic elastomers well suited are polyester elastomers (TPE-E), thermoplastic polyamide elastomers (TPE-A) and thermoplastic polyurethane elastomers (TPE-U). The above thermoplastic elastomers have active hydrogen atoms which can be reacted with the coupling reagents and/or the polyoxymethylene polymer. Examples of such groups are urethane groups, amido groups, amino groups or hydroxyl groups. For instance, terminal polyester diol flexible segments of thermoplastic polyurethane elastomers have hydrogen atoms which can react, for example, with isocyanate groups.

The amount of impact modifier contained in a polymeric composition can vary depending on many factors. In general, one or more impact modifiers may be present in the composition in an amount greater than about 5% by weight, such as in an amount greater than about 10% by weight. The impact modifier is generally present in an amount less than 30% by weight, such as in an amount less than about 25% by weight, such as in an amount up to about 18% by weight in order to provide sufficient impact strength resistance to the material.

When present, a coupling agent in the polymeric composition comprises a coupling agent capable of coupling the impact modifier to a POM polymer. A wide range of polyfunctional, such as trifunctional or bifunctional coupling agents, may be used. The coupling agent may be capable of forming covalent bonds with the terminal hydroxyl groups on a POM polymer and with active hydrogen atoms on the impact modifier. In this manner, the impact modifier becomes coupled to the POM through covalent bonds.

In one embodiment, the coupling agent comprises a diisocyanate, such as an aliphatic, cycloaliphatic and/or aromatic diisocyanate. The coupling agent may be in the form of an oligomer, such as a trimer or a dimer. In one embodiment, an aromatic polyisocyanate is used, such as 4,4'-diphenylmethane diisocyanate (MDI).

When present, a polymer composition can include a coupling agent in an amount from about 0.1% to about 10% by weight. In one embodiment, for instance, the coupling agent is present in an amount greater than about 1% by weight, such as in an amount greater than about 2% by weight. In one particular embodiment, the coupling agent is present in an amount from about 0.2% to about 5% by weight.

A formaldehyde scavenger may also be included in a polymeric composition. The formaldehyde scavenger, for instance, may be amine-based and may be present in an amount less than about 1% by weight.

A polymeric composition can optionally contain a stabilizer and/or various other known additives. Such additives can include, for example, viscosity reducing agents, antioxidants, acid scavengers, UV stabilizers or heat stabilizers, adhesion promoters, lubricants, nucleating agents, demolding agents, fillers, reinforcing materials or antistatic agents and additives which impart a desired property to the material, such as dyes and/or pigments.

In general, other additives can be present in the polymeric composition in an amount up to about 10% by weight, such as from about 0.1% to about 5% by weight, such as from about 0.1 to about 2% by weight.

The components of the polymeric composition can be melt blended together. In one embodiment, melt blending of the components can cause reaction to occur between individual components, such as a coupling agent, a POM polymer, and an impact modifier. Reaction between components can occur simultaneously or in sequential steps.

In one embodiment, the different components can be melted and mixed together in a conventional single or twin screw extruder. The melt blending of the components is typically carried out at temperatures of from about 100° C. to about 240° C., such as from about 150° C. to about 220° C., and the duration of mixing is typically from about 0.5 to about 60 minutes.

Following formation, the polymeric composition can be used as formed to prepare a fibrous additive for concrete or may be formed for later processing. For instance, extruded strands may be produced by an extruder which are then pelletized and stored for later use. Prior to compounding, the polymer components may be dried to a moisture content of about 0.05 weight percent or less. If desired, the pelletized compound can be ground to any suitable particle size, such as in the range of from about 100 microns to about 500 microns.

Manufacturing processes for forming fibers from the POM generally need not vary with the specific POM copolymers utilized in forming the composition, e.g., POM, POM-OH or lateral-OH POM.

For purposes of this disclosure, a monofilament fiber is herein defined to refer to a fiber that has been extruded or spun from a melt as an individual fiber. That is, while the extruded monofilament fiber can be subjected to post-extrusion processing (e.g., quenching, drying, drawing, heat processing, finish application, etc.), the fiber will be initially extruded or spun from a melt in the individual fiber form. A tape fiber, on the other hand, is intended to refer to fibers that have been formed from a larger section during post-extrusion processing. For example, the term 'tape fiber' can encompass fibers that have been cut or otherwise separated from a larger extruded film, for instance an extruded flat film or a film extruded as a cylinder. In general, tape fibers can have a clear delineation between adjacent sides of the fibers, with a clear angle between the adjacent sides, as they can usually be formed by cutting or slicing individual fibers from the larger polymer section, but this is not a requirement. For example, in one embodiment, individual tape fibers can be pulled from a larger polymeric piece, and thus may not show the sharper angles between adjacent edges that may be common to a tape fiber that has been cut from a larger piece of material.

Referring to FIG. 1, one embodiment of a POM fiber forming process generally 10 is schematically illustrated. According to the illustrated embodiment, a melt of a POM composition can be provided to an extruder apparatus 12.

The extruder apparatus 12 can be a melt spinning apparatus as is generally known in the art. For example, the extruder apparatus 12 can include a mixing manifold 11 in which a POM composition can be mixed and heated to form a molten composition. The formation of the molten mixture can generally be carried out at a temperature as described above, e.g., from about 100° C. to about 240° C.

Optionally, to help ensure the fluid state of the molten mixture, in one embodiment, the molten mixture can be filtered prior to extrusion. For example, the molten mixture can be filtered to remove any fine particles from the mixture with a filter of between about 180 and about 360 gauge.

Following formation of the molten mixture, the mixture can be conveyed under pressure to the spinneret 14 of the extruder apparatus 12, where it can be extruded through an orifice to form the fiber 9. The mixture can be extruded as either a monofilament fiber 9, as shown in FIG. 1, or as a film, for instance in either a sheet orientation or in a cylindrical orientation, and cut or sliced into individual tape fibers during post-processing of the film. In particular, while the majority of the ensuing discussion is specifically directed to the formation of a monofilament fiber, it should be understood that the below described processes are also intended to encompass the formation of a film for subsequent formation of a tape fiber.

The spinneret 14 can generally be heated to a temperature that can allow for the extrusion of the molten polymer while preventing breakage of the fiber 9 during formation. For example, in one embodiment, the spinneret 14 can be heated to a temperature of between about 125° C. and about 210° C. In one embodiment, the spinneret 14 can be heated to the same temperature as the mixing manifold 11. This is not a requirement of the process, however, and in other embodiments, the spinneret 14 can be at a different temperature than the mixing manifold 11. For example, in one embodiment, increasing temperatures can be encountered by the mixture as it progresses from the inlet to the mixing manifold to the spinneret. In one embodiment, the mixture can progress through several zones prior to extrusion.

When forming a monofilament fiber, the spinneret orifice through which the polymer can be extruded can generally be less than about 2.5 mm in maximum cross-sectional width (e.g., diameter in the particular case of a circular orifice). For example, in one embodiment, when forming a macrofiber, the spinneret orifices can be between about 1 mm and about 2.5 mm in maximum cross-sectional width. When forming a microfiber, the spinneret orifices can be between about 0.6 mm and about 1.5 mm in maximum cross-sectional width.

When forming a film, the film die can be of any suitable orientation and length, and can be set to a thickness of less than about 2.5 mm. For example, in one embodiment, the film die can be set at a width of between about 1 mm and about 2.5 mm.

Following extrusion of the polymer, the un-drawn fiber 9 can be quenched, for instance in a liquid bath 16 and directed by roll 18. The liquid bath 16 in which the fiber 9 can be quenched can be a liquid in which the polymer is insoluble. For example, the liquid can be water, ethylene glycol, or any other suitable liquid as is generally known in the art. Generally, in order to encourage formation of fibers with substantially constant cross-sectional dimensions along the fiber length, excessive agitation of the bath 16 can be avoided during the process. Of course, a liquid quench is not a requirement of disclosed processes, and in another embodiment, the un-drawn fiber can be quenched in an air quench, as is known.

Roll 18 and roll 20 can be within bath 16 and convey fiber 9 through the bath 16. Dwell time of the material in the bath 16 can vary, depending upon particular materials included in the polymeric material, particular line speed, etc. In general, fiber 9 can be conveyed through bath 16 with a dwell time long enough so as to ensure complete quench, i.e., crystallization, of the polymeric material. For example, in one embodiment, the dwell time of the material in the bath 16 can be between about 30 seconds and about 2 minutes.

At or near the location where the fiber 9 exits the bath 16, excess liquid can be removed from the fiber 9. This step can generally be accomplished according to any process known in the art. For example, in the embodiment illustrated in FIG. 1, the fiber 9 can pass through a series of nip rolls 23, 24, 25, 26 to remove excess liquid from the fiber. Other methods can be alternatively utilized, however. For example, in other embodiments, excess liquid can be removed from the fiber 9 through utilization of a vacuum, a press process utilizing a squeegee, one or more air knives, and the like.

According to another embodiment, the extruded fiber can be quenched according to an air cooling procedure. According to this embodiment, an extruded fibers can be carried out under an air flow at a pre-determined temperature, for instance between about 30° C. and about 80° C., or about 50° C. in one embodiment.

In one embodiment, a lubricant can be applied to the fiber 9. For example, a spin finish can be applied at a spin finish applicator chest 22, as is generally known in the art. In general, a lubricant can be applied to the fiber 9 at a low water content. For example, a lubricant can be applied to the fiber 9 when the fiber is at a water content of less than about 75% by weight. Any suitable lubricant can be applied to the fiber 9. For example, a suitable oil-based finish can be applied to the fiber 9, such as Lurol PP-912, available from Ghoulston Technologies, Inc. Addition of a finishing or lubricant coat on the fiber can, in some embodiments, improve handling of the fiber during subsequent processing and can also reduce friction and static electricity build-up on the fiber.

After quenching of the fiber 9 and any optional process steps, such as addition of a lubricant for example, the fiber can be drawn while applying heat. For example, in the embodiment illustrated in FIG. 1, the fiber 9 can be drawn in an oven 43 heated to a temperature of between about 100° C. and about 175° C. Additionally, in this embodiment, the draw rolls 32, 34 can be either interior or exterior to the oven 43, as is generally known in the art. In another embodiment, rather than utilizing an oven as the heat source, the draw rolls 32, 34 can be heated so as to draw the fiber while it is heated. For example, the draw rolls can be heated to a temperature of between about 150° C. and about 190° C. In another embodiment, the fiber can be drawn over a hotplate heated to a similar temperature or by passing through a heated liquid bath.

The fiber can be drawn in a first (or only) draw at a high draw ratio. For example, the fiber 9 can be drawn with a draw ratio (defined as the ratio of the speed of the second or final draw roll 34 to the first draw roll 32) of greater than about 5. For instance, in one embodiment, the draw ratio of the first (or only) draw can be greater than about 8. In another embodiment, the draw ratio can be up to about 10. Additionally, the fiber can be wrapped on the rolls 32, 34 as is generally known in the art. For example, in one embodiment, between about 5 and about 15 wraps of the fiber can be wrapped on the draw rolls.

A multi-stage draw can optionally be utilized. For instance, in a two stage draw, a fiber can be drawn to about 3 to about 15 times the original length in a first stage at a temperature of between about 60° C. and about 160° C., or between about 120° C. and about 150° C. in another embodiment. In a second stage draw, the fiber can be drawn from about 1.05 to about 6 times the length of the fiber following the first stage draw, or from about 1.05 to about 2 times the length of the fiber following the first stage draw in another embodiment. The second draw can generally be carried out at a temperature that is higher than the temperature of the first stage draw, for example between about 100° C. and about 165° C., or from about 150° C. to about 160° C. in another embodiment.

Multi-stage drawing processes can be carried out in similar or different environments. For instance, a first stage draw can be carried out in a heated oven, and a second stage can be carried out in a heated liquid bath. Multi-stage draws can include two, three, or higher numbers of stages can be utilized. In one embodiment, a three stage draw can be used in which the fiber can be subjected to a first draw in air, a second draw in a heated aqueous bath and a third draw in a heated organic solution (e.g., an oil).

While the embodiment of FIG. 1 utilizes a series of draw rolls for purposes of drawing the fiber, it should be understood that any suitable process that can place a force on the fiber so as to elongate the fiber following the quenching step can optionally be utilized. For example, any mechanical apparatus including nip rolls, godet rolls, steam cans, air, steam, or other gaseous jets can optionally be utilized to draw the fiber.

Following the drawing step, the drawn fiber 30 can be cooled and wound on a take-up roll 40. In other embodiments, however, additional processing of the drawn fiber 30 may be carried out.

Optionally, the drawn fiber can be heat set. For example, the fiber can be relaxed or subjected to a very low draw ratio (e.g., a draw ratio of between about 0.7 and about 1.3) and subjected to a temperature of between about 140° C. and about 170° C. for a short period of time, generally less than about 3 minutes. In some embodiment, a heat setting step can be less than one minute, for example, about 0.5 seconds. This optional heat set step can serve to "lock" in the crystalline structure of the fiber following drawing. In addition, it can reduce heat shrinkage.

The drawn fiber can be surface treated to improve certain characteristics of the fiber, such as wettability or adhesion, for example. For instance, the fiber can be fibrillated, subjected to plasma or corona treatments, or can include an added surface fiber sizing, all of which are generally known in the art, to improve physical characteristics of the fiber.

In an embodiment in which a film is formed at the extruder, a tape fiber can be formed from the film either before or after the draw step, as desired. For example, in one embodiment the film can be subjected to a drawing step, and the drawn film can be further processed to form the tape fibers of the present invention. In another embodiment, the film can be processed to form the tape fibers first, and then the formed fibers can be drawn, as described above for a monofilament fiber. In either case, the tape fibers can be cut or formed from the film according to any process as is generally known in the art including, for example, use of metal blades, rotary knives, and the like.

In general, the finished fiber 30 can be wound on a spool or take-up reel 40, as shown, and transported to a second location for formation of the fibrous additives. In an alternative embodiment, however, the fiber can be fed to a second processing line, where the fiber can be further processed to form the fibrous additives.

Following the drawing of the fiber, a drawn fiber including a POM copolymer as described can exhibit a tenacity of greater than about 5 g/den, for instance greater than about 10 g/den. In one embodiment, a drawn fiber can exhibit a tenacity of less than about 15 g/den, for instance between about 5 g/den and about 15 g/den, or between about 5 g/den and about 10 g/den, in another embodiment.

According to one embodiment, the fibers can be utilized as-formed as reinforcement material for concrete. In another embodiment, following formation, a fiber can be further processed prior to use as a reinforcement material in concrete. For instance, fibers can be chopped, fibrillated, flattened, bent, or otherwise deformed prior to combination with concrete or a component thereof.

As used herein, the term 'concrete' generally refers to an artificial material formed from one or more course aggregates mixed with water, a cementitious binder, and any suitable modifiers. The aggregate may comprise a quartz sand or calcium carbonate, or other suitable aggregate. The binder may include, for instance, Portland cement or gypsum. Traditional concrete generally has a density of between about 2000 kilogram per cubic meter ($kg/m^3$) and about 2500 $kg/m^3$. Foamed concrete is also encompassed by the term. Foamed concrete incorporates a foaming agent during the formation process and is much lighter than traditional concrete, generally having a density of between about 400 $kg/m^3$ and about 1600 $kg/m^3$. The term 'concrete' encompasses, without limitation, hydratable cementitious compositions including ready-mix or pre-cast concrete, masonry concrete, shotcrete, bituminous concrete, gypsum compositions, cement-based fireproofing compositions, and the like. The binder can be present in the cementitious composition in an amount greater than about 5% by weight of the concrete, or greater than about 20% by weight. In one embodiment, the binder can be present in an amount up to about 50%, or up to 80% by weight of the concrete. When describing the cementitious composition, the above percentages by weight are based upon the weight percentage of dry material and thus excludes water if present in the product.

Fibrous reinforcement materials can include fibers of any suitable size and geometry. By way of example, individual microfibers of between about 1 denier and about 10 denier, for instance less than about 5 denier, or less than about 3 denier, can be included in concrete. Macrofibers, for example fibers between about 500 denier and about 4000 denier, can be utilized as fibrous reinforcement as described herein. For instance, macrofibers of about 1000 denier, or greater than about 1000 denier or greater than about 1200 denier. Macrofibers can be less than about 2500 denier, or less than about 1800 denier. Fibers including a round cross sectional geometry can be preferred in some embodiments, but this is not a requirement, and micro- and/or macro-fibers of a noncircular cross sectional shape, and/or crimped fibers, as well as fibrous mesh reinforcements can be preferred in other embodiments. Mixtures of different POM fibers can also be utilized, which can be combined with concrete at the same time or sequentially, as desired.

In one embodiment, a concrete mixture can include a multitude of relatively short lengths of the fibers distributed throughout the matrix. For example, a concrete mixture can include monofilament fibers and/or tape fibers that have been cut or chopped to a length of less than about 5 inches. In one embodiment, the fibers can be less than about 3 inches in length, for instance, less than about 1 inch in length.

POM fibrous additives can be added at relatively low loading levels and can provide significant improvement to concrete. For instance, POM macrofibers can be added at a level up to about 8 $lb/yd^3$, or up to about 5 $lb/yd^3$ in one embodiment, or greater than about 2 $lb/yd^3$, or greater than about 3 $lb/yd^3$. POM microfibers can generally be added at lower loading levels than POM macrofibers. For instance, POM microfibers can be added at a level up to about 3 $lb/yd^3$, or up to about 2 $lb/yd^3$ in one embodiment, or greater than about 1 $lb/yd^3$, or greater than about 0.5 $lb/yd^3$ POM fibrous additives can be blended with wet cement while considering several variables including temperature, time, concentration, type of material, and the like, according to known practices so as to obtain a composite including the fibers randomly distributed throughout the composite with little or no agglomeration. Generally, a predetermined amount of POM fibrous additives can be added to concrete during the regular mixing phase of the preparation. For instance, POM fibrous additives can be added to concrete, or a component of the concrete, either in a dry-phase addition or a wet-phase addition.

In a dry-phase addition, POM fibrous additives can be added and mixed with the aggregate or the dry cement prior to mixing with water. In a wet-phase process, POM fibrous additives can be added to the wet component (cement/water mixture), generally at ambient temperature, prior to combination with the aggregate.

In general, the cementitious composition can contain any suitable aggregate. Aggregates that may be used include, for instance, quartz sand, calcium carbonate, talc, dolomite, aluminum silicates, mica, pumice, perlites, vermiculites, and mixtures thereof. Aggregate can generally be present in the cementitious composition in an amount from about 10% to about 90% by weight, such as from about 40% to about 90% by weight, such as from about 60% to about 80% by weight.

The concrete can be formed with additional modifiers as are generally known in the art. For instance, in addition to the POM fibers, additional fibers such as glass fibers, steel fibers, natural fibers, and polymeric fibers including polyolefins, polyamides (e.g., nylon), and so forth can be incorporated in the concrete. Other modifiers include mesh, rebar, cellulose ethers, and the like.

Standard mixing times as are known in the art can be utilized. However, mixing times can vary greatly, as is known, for instance from about five minutes to well over an hour, depending on local conditions, specific materials, and so forth. Thorough mixing of the materials can randomly distribute the POM fibrous additives throughout the composition with little or no agglomeration of the fibers in the binder.

Following mixing and lying of the cement, the materials can set according to standard processes.

Utilization of fibers formed of a composite including POM copolymers can provide many benefits to a concrete. For instance, POM has higher density than polypropylene, which can reduce bloom of the fibers to the surface during finishing. In addition, POM fibers have higher polarity, resulting in greater miscibility of POM fibers with the concrete matrix. This characteristic can be enhanced when utilizing POM copolymers formed to include a high level of certain terminal groups, e.g., hydroxyl groups. POM fibers can also be drawn to achieve high tenacity values, which can impart improved strength characteristics to a concrete incorporating the fiber. In addition, POM copolymers can be formed to include terminal groups that can exhibit bonding to the concrete matrix, which can provide a greater level of reinforcement.

The present disclosure may be better understood by reference to the Examples, below.

Example 1

POM fibers were formed from monomeric reactants as follows:
1) Polymerization of trioxane with 1,3-dioxolane utilizing a $BF_3$ initiator and a methylal chain transfer agent—designated POM.
2) Polymerization of trioxane with 1,3-dioxolane utilizing a $BF_3$ initiator and an ethylene glycol chain transfer agent—designated POM-OH.
3) Polymerization of trioxane with glycerol formal formate utilizing a $BF_3$ initiator and an ethylene glycol chain transfer agent—designated lateral OH—POM.

POM fibers were formed utilizing a twin screw reactor with mixing, grinding, and conveying sections. The L/D of the reactor was 15:1. Feed rate was 10000 to 20000 lb/hr. Dioxolane concentration was 3.4 (to 6.2) % (w/w), methylal concentration was about 600 ppm, and $BF_3$ was 10 to 20 ppm. Screw speed was about 30 rpm. The temperature in the reactor was between 90° C. and 95° C. The raw polymer was quenched on exiting the reactor with triethylamine in methanol/water solvent, followed by solution hydrolysis in a methanol/water (~80/20) solvent with triethylamine present to catalyze the hydrolysis. The hydrolyzed polymer was precipitated from the solution by dropping the pressure (thereby cooling the mixture) followed by centrifuging and drying in a series of dryers. This polymer flake was compounded with standard antioxidant and scavengers. The subsequent pellets were melt spun into fibers, quenched in air, and drawn to increase tenacity (draw ratio of 5 to 9) and cut into fiber staple.

POM-OH fibers were formed according to a similar process, except 500-600 ppm of ethylene glycol was used in place of methylal. Fiber manufacture was identical.

Lateral-OH POM was formed in a lab scale unit. Reactor conditions were similar to those of the above described processes. Feed rates were in the range of 2 to 10 kg/hr. The GFF was added at 1 to 2 mol %, along with ~3% dioxolane. Ethylene glycol was used as the chain transfer agent.

The three different POM-based microfibers of 4 to 6 denier with tenacities up to 7.5 g/den were formed as described and compared to a polypropylene fiber of the same general size.

Water contact angle for the polypropylene fiber (PP), the POM fiber, and the POM-OH fiber is compared in FIG. 1. As can be seen, the POM fibers exhibit decreasing values for water contact angle, indicating improved hydrophilic characteristics.

Example 2

POM, POM-OH, and PP fibers formed as described in Example 1 were mixed with wet concrete and utilized in an experimental sidewalk pour. Only the sections using polypropylene fibers showed a significant fiber concentration on the surface. This result serves to verify the prediction that the combination of increased hydrophilicity and the higher density of POM fibers in general will lead to a greater miscibility of POM fibers over polypropylene fibers in a wet concrete matrix.

Example 3

Figure 2:
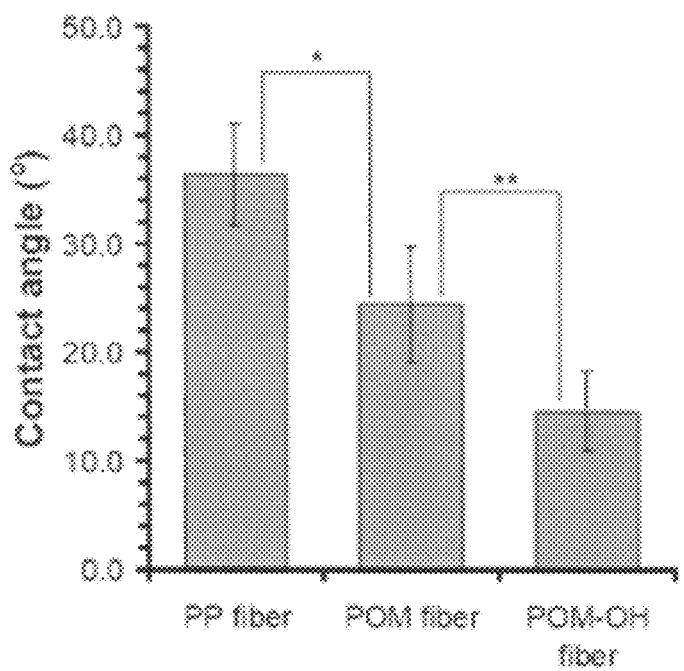
FIG. 2 compares water contact angle for three different microfibers, one of the microfibers was formed of polypropylene and the other two were formed of polyoxymethylene (POM) copolymers.
Figure 3:
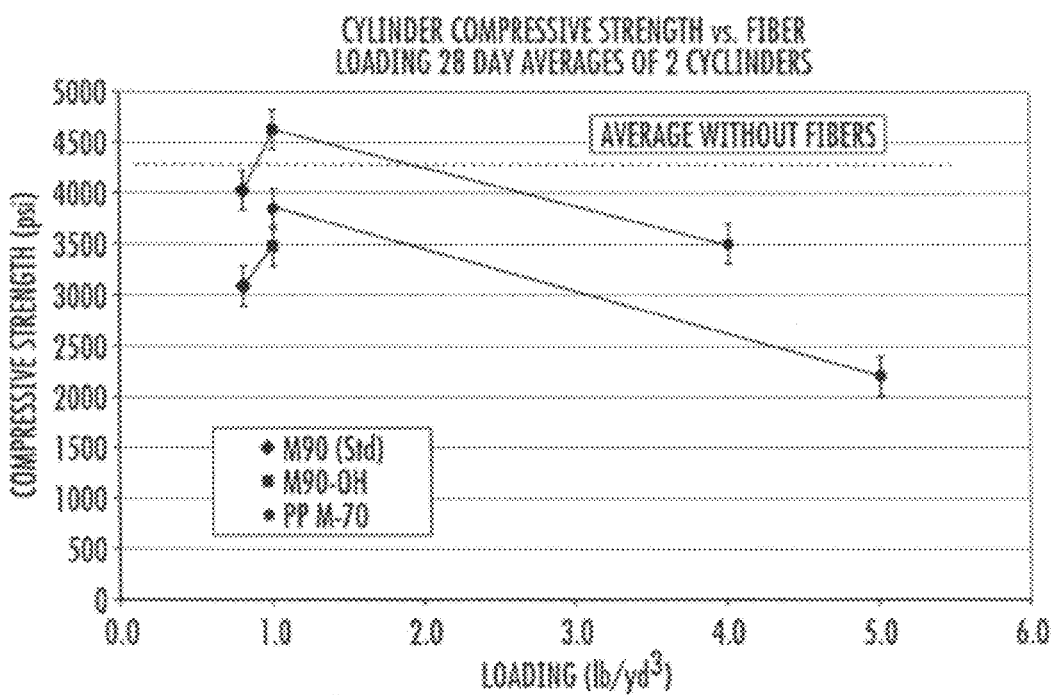
FIG. 3 compares the change in compressive strength with fiber loading level for concrete samples including different microfibers, one concrete sample included microfibers formed of polypropylene and the other two concrete samples included microfibers formed of POM copolymers.

During the sidewalk pour of Example 2, concrete cylinders were also cast using the different concretes that incorporated the different fibers as additives. Compressive strength measurements of the concrete cylinders were made. Results are shown in FIG. 2. As can be seen, the observed trends are consistent with the improved secondary reinforcement to the concrete provided by the POM fibers, which exhibit increased tenacity and adhesion as compared to the polypropylene fibers.

FIG. 2 shows little difference between polypropylene and POM fibers, indicating that the increase in polarity for POM fibers, while it improves miscibility, does little to enhance the strength of the concrete. This is likely due to the low level of —C₂OH end groups in standard POM. On the other hand, the compressive strength of the POM-OH containing samples is significantly higher than observed for either standard POM or polypropylene containing samples. This is consistent with bonding between the —C₂OH end groups on the surface and the concrete matrix (e.g., —Si—OH moieties).

These and other modifications and variations to the present disclosure may be practiced by those of ordinary skill in the art, without departing from the spirit and scope of the present disclosure, which is more particularly set forth in the appended claims. In addition, it should be understood that aspects of the various embodiments may be interchanged either in whole or in part. Furthermore, those of ordinary skill in the art will appreciate that the foregoing description is by way of example only, and is not intended to limit the disclosure so further described in such appended claims.

What is claimed is:

1. A concrete comprising:
    an aggregate;
    a cementitious binder; and
    a plurality of discrete fibers randomly distributed throughout the concrete, the fibers comprising a polyoxymethylene copolymer in an amount of at least about 50% by weight of the fibers, at least about 50% of the terminal groups of the polyoxymethylene copolymer being hydroxyl groups, the fibers exhibiting a water contact angle of less than about 30°, the fibers comprising microfibers and/or macrofibers.

2. The concrete of claim 1, wherein the fibers exhibit a water contact angle of less than about 20°.

3. The concrete of claim 1, wherein the polyoxymethylene copolymer is the product of a copolymerization reaction of trioxane with a cyclic acetal containing at least one $O(CH_2)_n$ group where n is greater than 1.

4. The concrete of claim 1, wherein the polyoxymethylene copolymer is the product of a copolymerization reaction of trioxane with a cyclic formal having pendant acrylate or substituted acrylate ester groups.

5. The concrete of claim 1, wherein the polyoxymethylene copolymer is the product of a copolymerization reaction of trioxane with a cyclic ester.

6. The concrete of claim 1, wherein the polyoxymethylene copolymer is the product of a copolymerization reaction of trioxane with glycerol formal acetate.

7. The concrete of claim 1, wherein the polyoxymethylene copolymer is the product of a copolymerization reaction of trioxane with glycerol formal formate.

8. The concrete of claim 1, wherein the polyoxymethylene copolymer comprises three or more different monomer units.

9. The concrete of claim 1, wherein the melt index of the polyoxymethylene copolymer is between about 2 dg/min and about 30 dg/min.

10. The concrete of claim 1, the fibers further comprising an impact modifier.

11. The concrete of claim 1, the composite comprising the microfibers in an amount of from about 1 pound per cubic yard up to about 3 pounds per cubic yard.

12. The concrete of claim 1, the composite comprising the macrofibers in an amount of from about 2 pounds per cubic yard up to about 8 pounds per cubic yard.

13. The concrete of claim 1, wherein the fibers are deformed fibers.

14. The concrete of claim 1, the composite comprising a mixture of different fibers.

15. The concrete of claim 1, wherein the fibers are less than about 5 inches in length.

16. The concrete of claim 1, wherein the fibers are drawn fibers.

17. A method of forming concrete comprising randomly dispersing a plurality of discrete fibers throughout the concrete, the fibers comprising a polyoxymethylene copolymer in an amount of at least about 50% by weight of the fibers, at least about 50% of the terminal groups of the polyoxymethylene copolymer being hydroxyl groups, the fibers exhibiting a water contact angle of less than about 30°, the fibers comprising microfibers and/or macrofibers.

18. The method according to claim 17, further comprising forming the fibers from a composition including the polyoxymethylene copolymer.

19. The method according to claim 18, wherein the fibers are extruded or spun from a melt of the composition.

20. The method according to claim 18, further comprising drawing the fibers.

21. The method according to claim 17, further comprising mixing the fibers with dry cement.

22. The method according to claim 17, further comprising mixing the fibers with wet cement.

23. The concrete of claim 10, wherein the impact modifier comprises a thermoplastic elastomer.

24. The concrete of claim 10, the fibers further comprising a coupling agent capable of coupling the impact modifier to the polyoxymethylene copolymer.

25. The concrete of claim 1, wherein the macrofibers have a denier of between about 500 denier and about 4000 denier.

26. The concrete of claim 1, wherein the microfibers have a denier of between about 1 denier and about 10 denier.

27. The method according to claim 17, wherein the macrofibers have a denier of between about 500 denier and about 4000 denier.

28. The method according to claim 21, wherein the microfibers have a denier of between about 1 denier and about 10 denier.

* * * * *